United States Patent [19]
Legall et al.

[11] Patent Number: 6,005,565
[45] Date of Patent: *Dec. 21, 1999

[54] INTEGRATED SEARCH OF ELECTRONIC PROGRAM GUIDE, INTERNET AND OTHER INFORMATION RESOURCES

[75] Inventors: Loretta C. Legall, Los Altos; Hans Masli, San Jose; Charles J. Kulas, San Francisco, all of Calif.

[73] Assignees: Sony Corporation, Tokyo, Japan; Sony Electronics, Inc., Park Ridge, N.J.

[*] Notice: This patent issued on a continued prosecution application filed under 37 CFR 1.53(d), and is subject to the twenty year patent term provisions of 35 U.S.C. 154(a)(2).

[21] Appl. No.: 08/827,035

[22] Filed: Mar. 25, 1997

[51] Int. Cl.⁶ ........................................ G06F 13/00
[52] U.S. Cl. ................ 345/327; 345/340; 345/969; 348/7; 348/13; 348/906
[58] Field of Search .................. 345/327, 353; 348/13, 7, 906, 564

[56] References Cited

U.S. PATENT DOCUMENTS

| | | | |
|---|---|---|---|
| 4,706,121 | 11/1987 | Young | 358/142 |
| 4,751,578 | 6/1988 | Reiter et al. | 358/183 |
| 5,038,211 | 8/1991 | Hallenbeck | 358/142 |
| 5,485,197 | 1/1996 | Hoarty | 348/7 |
| 5,523,796 | 6/1996 | Marshall et al. | 348/589 |
| 5,550,578 | 8/1996 | Hoarty et al. | 348/7 |
| 5,585,838 | 12/1996 | Lawler et al. | 348/13 X |
| 5,589,892 | 12/1996 | Knee et al. | 348/906 |
| 5,623,613 | 4/1997 | Rowe et al. | 345/353 |
| 5,671,411 | 9/1997 | Watts et al. | 348/906 X |
| 5,673,089 | 9/1997 | Yuen et al. | 348/734 |
| 5,684,525 | 11/1997 | Klosterman | 348/906 |
| 5,778,181 | 7/1998 | Hidary et al. | 348/12 X |

FOREIGN PATENT DOCUMENTS

WO96/34486  10/1996  WIPO.

OTHER PUBLICATIONS

Young–Woo Park, et al., "A New Generation Method of a User Profile for Information Filtering on the Internet", 1998, pp. 261–264.

Ehrmantraut, M., et al., "The Personal Electronic Program Guide—Towards the Pre-Selection of Individual TV Programs", 1996, pp. 243–250.

International Searching Authority for PCT/US 98/05684, dated Jul. 27, 1998.

Primary Examiner—Raymond J. Bayerl
Assistant Examiner—Chadwick A. Jackson
Attorney, Agent, or Firm—Blakely, Sokoloff, Taylor & Zafman, LLP

[57] ABSTRACT

A power search tool that enables a user to search an electronic program guide and other information resources with one search. A search tool window is displayed that enables a user to select filter elements used to search. Alternately, in one embodiment, the filter elements are automatically selected from predetermined program elements, such as title or subject, of a selected program in the electronic program guide. The search tool performs a search of the electronic program guide and information resource and modifies the display of the electronic program guide to identify those programs that are filtered from the search. Similarly, a window displays information indicating those portions of the information resource that have been filtered during the search. Preferably the information resource is the world wide web and the URLs of the web sites that include information relative to the filter elements are displayed. The user can then view the electronic program guide and select broadcasts of programs to display as well as proceed to the web sites indicated simply by selection of the corresponding elements on the display.

20 Claims, 6 Drawing Sheets

INTEGRATED SEARCH OF ELECTRONIC PROGRAM GUIDE, INTERNET AND OTHER INFORMATION RESOURCES

BACKGROUND OF THE INVENTION

1. Field of the Invention

The present invention is directed to a search utility that enables a user to search for and to access information from a variety of information resources.

2. Art Background

Information is available from a variety of information resources. For example, a user can acquire information from the World Wide Web. In addition, many broadcasts, such as those sent via satellite and cables, include information regarding the broadcast that enables the construction of an electronic program guide that can be displayed on the broadcast display device or other display device.

Multimedia capability available on today's computers enable a user to view data as well as graphical information including video, audio or broadcast programs on the user's desktop. Thus, the desktop can consist of and access a variety of information resources. To search these resources, the user often has to create and re-execute queries for each of the different types of resources available. This is quite cumbersome. It is therefore desirable to perform searches that can be carried across a variety of information platforms.

SUMMARY OF THE INVENTION

The system and method of the present invention provides an integrated search tool for specifying and searching a variety of information resources. In one embodiment, the search tool is used for searching broadcast information and Internet information using a single user-initiated search. The search criteria can be saved as a filter, which can be executed at a later time. Results of the search are presented to the user. The user can then display available Web sites and/or an electronic program guide (EPG) containing program information that meets the search criteria. Via the EPG, broadcasts can be selected and displayed on the display. Thus, the user can access broadcast information and Internet information on the same search topic and criteria without performing multiple searches or recreating the search criteria.

BRIEF DESCRIPTION OF THE DRAWINGS

The objects, features and advantages of the present invention will be apparent to one skilled in the art in the following detailed description in which.

DETAILED DESCRIPTION

In the following description for purposes of explanation, numerous details are set forth in order to provide a thorough understanding of the present invention. However, it will be apparent to one skilled in the art that these specific details are not required in order to practice the present invention. In other instances, well known electrical structures and circuits are shown in block diagram form in order not to obscure the present invention unnecessarily.

Figure 1:
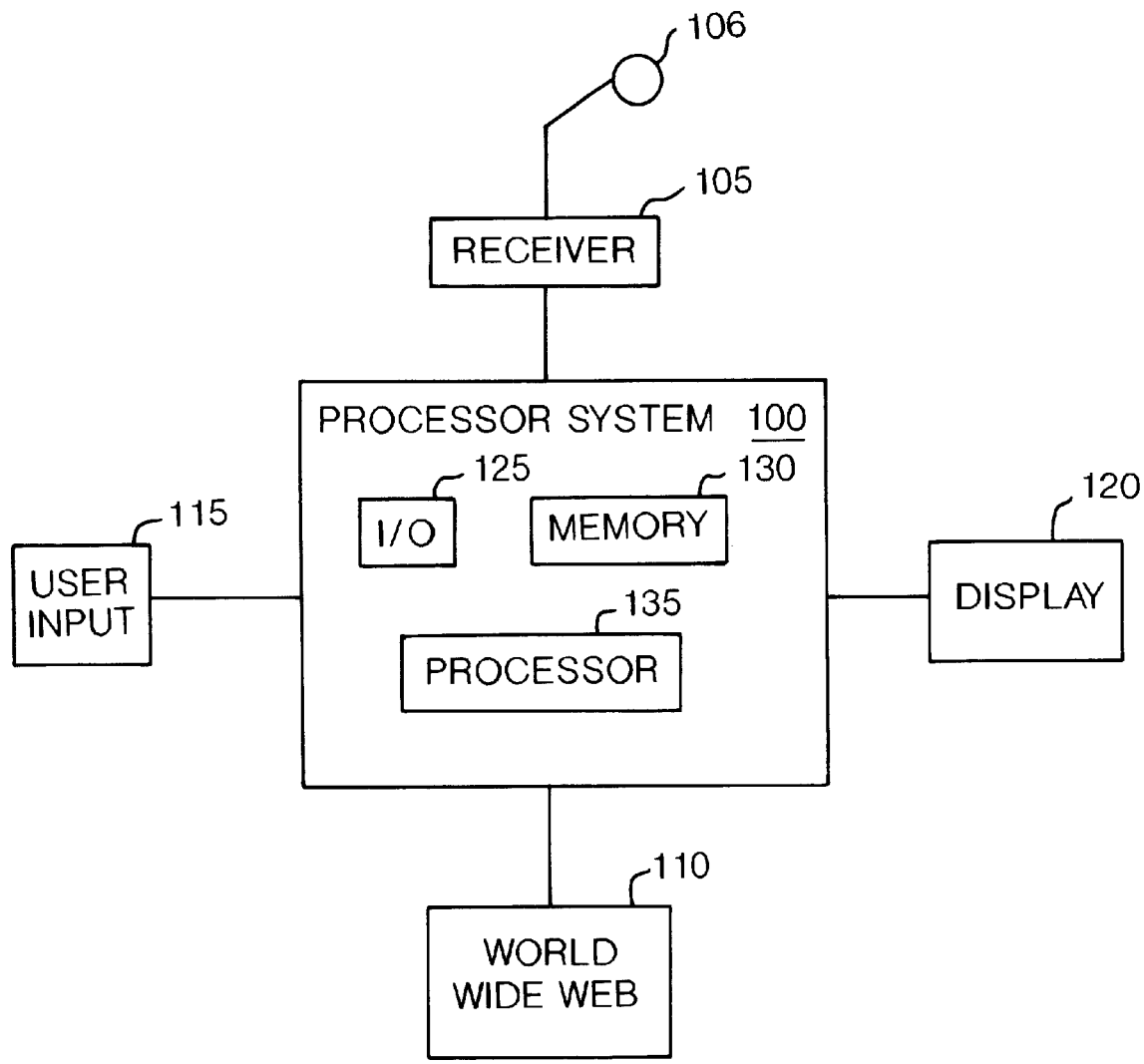
FIG. 1 is a simplified block diagram of the system that operates in accordance with the teachings of the present invention.

A simplified block diagram of a system which incorporates the system of the present invention is illustrated in FIG. 1. A variety of systems may be used. For example, a multimedia computer, such as the Sony PC manufactured by Sony Corporation may be utilized. The system 100 typically includes a central processing unit (CPU) 130, memory 135, input/output circuitry 125, as well as other circuitry and components that are well known to those skilled in the art. The system 100 will output information to a display 120 and, may also provide audio through speakers 126. The information may be received through receiver 105. Receiver 105 in one embodiment is a satellite receiver for receiving satellite transmissions of broadcasts and programming information through antenna 106. Using the programming information received through receiver 105, the system 100 can generate an electronic program guide (EPG) on the display 120. As will be described below, the EPG can be modified or filtered according to the searching performed by the user using the power search tool described herein.

The user can provide input to the system 100 through a user input device 115 which may include a keyboard, mouse, remote control or other input device. The system 100 further has access to the Internet through Internet access 110, and also can access previously accessed and stored web pages. Using this access mechanism, which may be an Internet provider or other connection to the Internet, the user can search for external information including information available on the World Wide Web and previously broadcasted Web pages. It is readily apparent that the system is not limited to Internet access and can access a variety of external or internal resources including third party databases.

Figure 2:
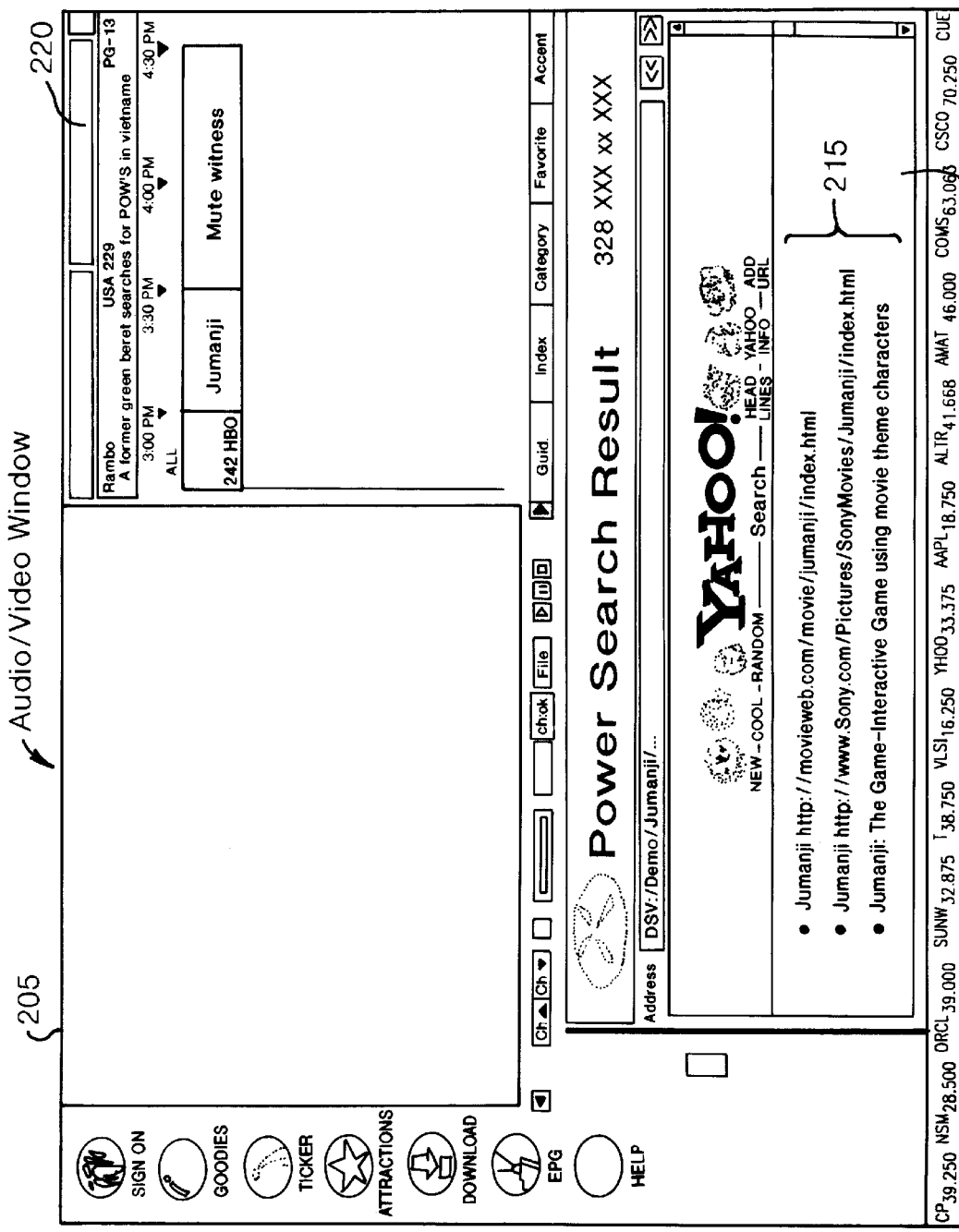
FIGS. 2 illustrates an exemplary search result of the power search tool of the present invention.

The display, as shown for example in FIG. 2, can include a variety of information, such as web sites and television broadcasts. For example, referring to FIG. 2, the display may include a program currently being broadcast in area 205, HTML frame 210, which may display a list of web sites or a particular web site 215, and/or electronic program guide of broadcast information 220, and a tool area, which enables the user to manipulate the information and resources used and the information displayed including the power search tool that is described below. In the present embodiment, Window 210 is executing a Web browser application (such as Mosaic® or Netscape®) that uses a Yahoo® search engine to search the World Wide Web. The browser displays the search results of the query in the Window 210. Using the browser, the user can switch from one site to another seamlessly. Uniform resource locator (URL) information also is displayed; the integration is seamless as the user can select sites to view by selection of the corresponding URL or alternately via utilization of the browser or search engine. Window 220 adapts the EPG window to display the result of broadcast data query. Immediate tune-in is available by selection of a current EPG element in the Window 220.

Figure 3A:
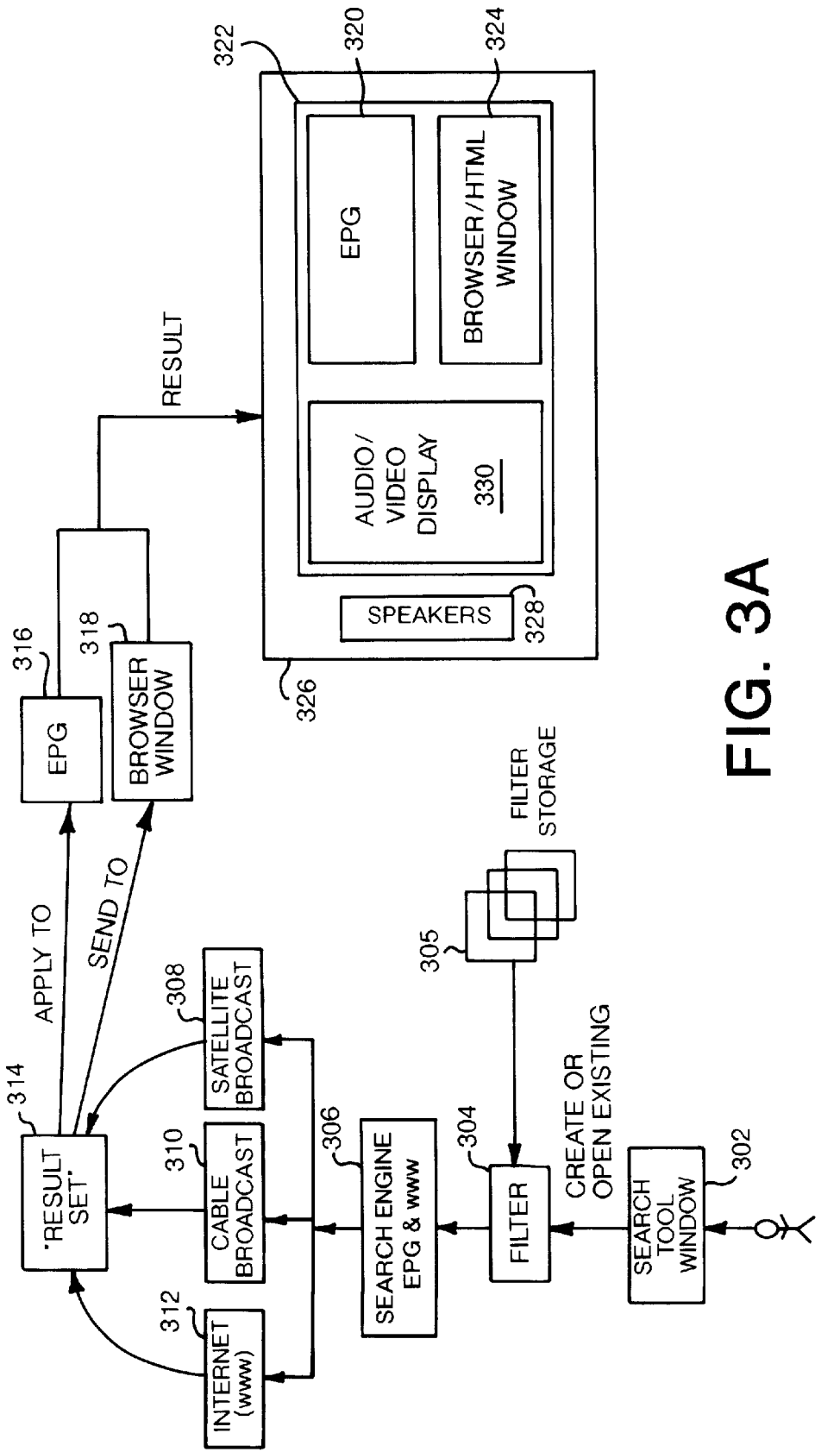
FIGS. 3a, 3b, and 3c present an overview of the functionality provided by the power search tool of the present invention.
Figure 3B:
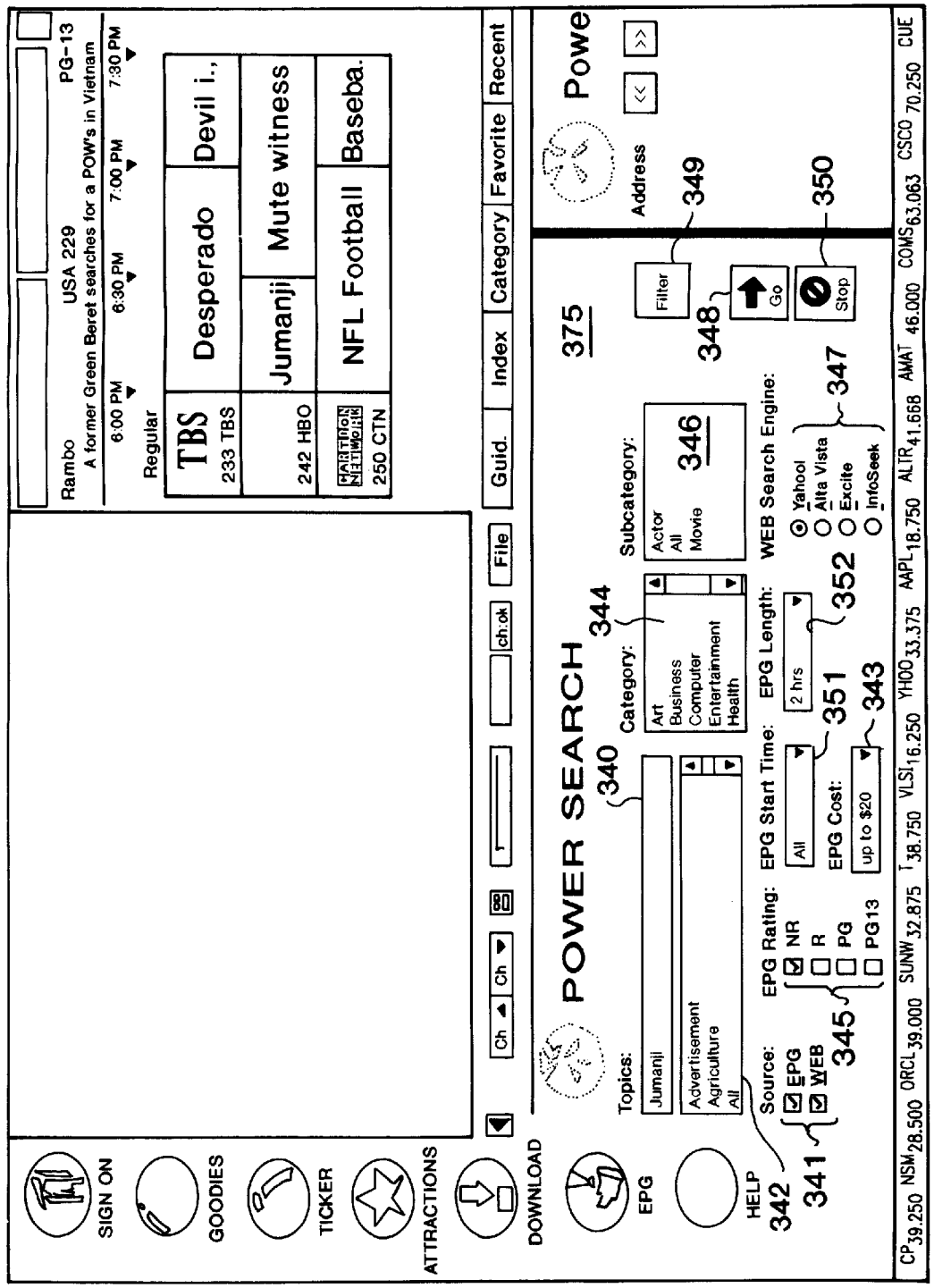
Figure 3C:
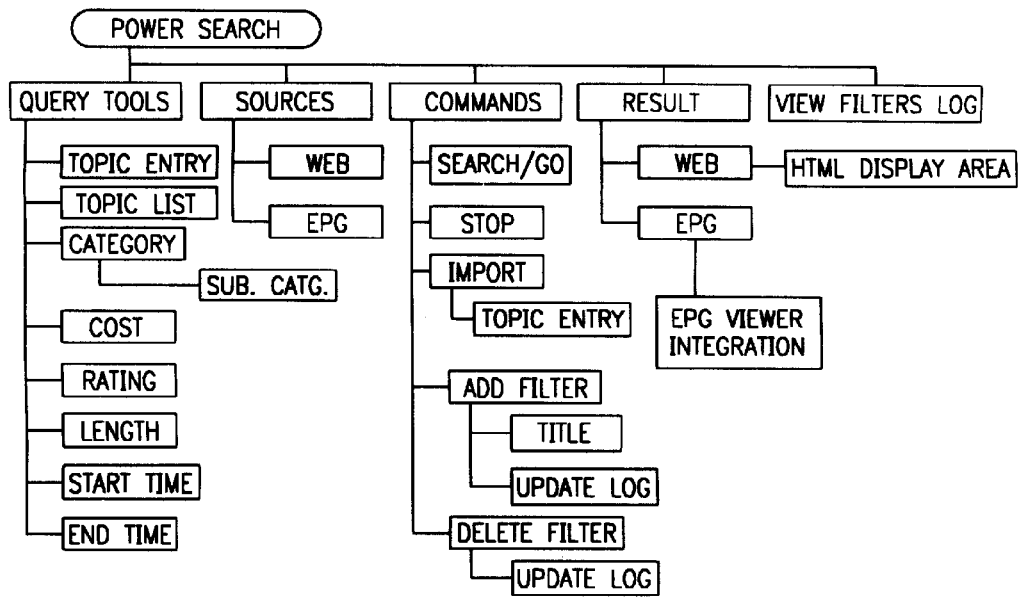

An overview of the power search tool is illustrated in the flow diagram of FIG. 3a, the diagram of FIG. 3b and diagram of FIG. 3c. The power search tool includes query tools for specifying and selecting the filter elements used to perform the search. The user can select the information sources to be searched, such as the World Wide Web and electronic program guide (EPG) information. In the present embodiment, the World Wide Web and EPG information are accessed; however, it is readily apparent that the resources can be expanded to include other resources, and furthermore, that one, some, or all of the resources can be selected for searching. The user can also invoke commands to perform a search, stop a search, import information for performing the search, as well as maintaining logs of searches performed for subsequent references. Furthermore, the user can select what is to be searched and displayed, such that only web information is displayed, EPG information is only displayed, or all information is displayed.

Referring to FIG. 3a, a user, using a search tool window 302 (e.g., window 375, FIG. 3b), can establish the topics that form elements of a filter 304 that is input to a search engine 306. The search engine 306 interacts with the different information resources, e.g., internet 312, cable broadcast 310 and satellite broadcast 308, to generate a result set 314 of information. This set 314 is applied to the EPG 316 to modify the EPG 316 to display or highlight those programs that meet the filter requirements. These results are displayed in the EPG area 320 of the display 322. The display may be part of a television and/or processing device 326. Similarly the result set 314 can be sent to the browser 318 to provide the results of a web search in a browser or HTML based window 324. As noted earlier, the EPG can be used to tune to a broadcast by selection of an EPG element (e.g., program listing). The video is displayed in window 330 and the audio is preferably output through speakers 328.

FIG. 3b illustrates one example of a display which includes the search tool of the present invention. The window 375 includes a topic area 340 in which the user can define the topic which is the subject of the filter. The present embodiment includes a listing 342 of previously used topics. This enables the user to easily select a prior topic. The listing 342 is preferably automatically updated to include each new topic as is it used by the user. The search tool also includes searching categories 344 and subcategories 346 which are selectable by the user. As is readily apparent, the system can be configured to include a variety of categories and corresponding subcategories. The sources to be searched 341 are also selectable. Other parameters included in the present embodiment are the program rating 345, program start time 351, program length 352, program cost 343 and the web search engine utilized 347. Once the user selects to proceed with the search, e.g., using "go" button 348 the window is shifted to display the power search result window (e.g., window 210, FIG. 2). The EPG is also updated to reflect those programs that meet the filter criteria (see e.g., window 220, FIG. 2). In the present embodiment, filter button 349 is provided. The selection of the filter button brings up a subwindow (not shown) of additional filter features. For example, the user can save and recall the current and previously saved filter elements, respectively. The stop button 350 allows the user to terminate the search if desired. FIGS. 3a and 3b illustrate one embodiment; the block diagram of FIG. 3c illustrates a variety of features and functions that can be used.

Figure 4:
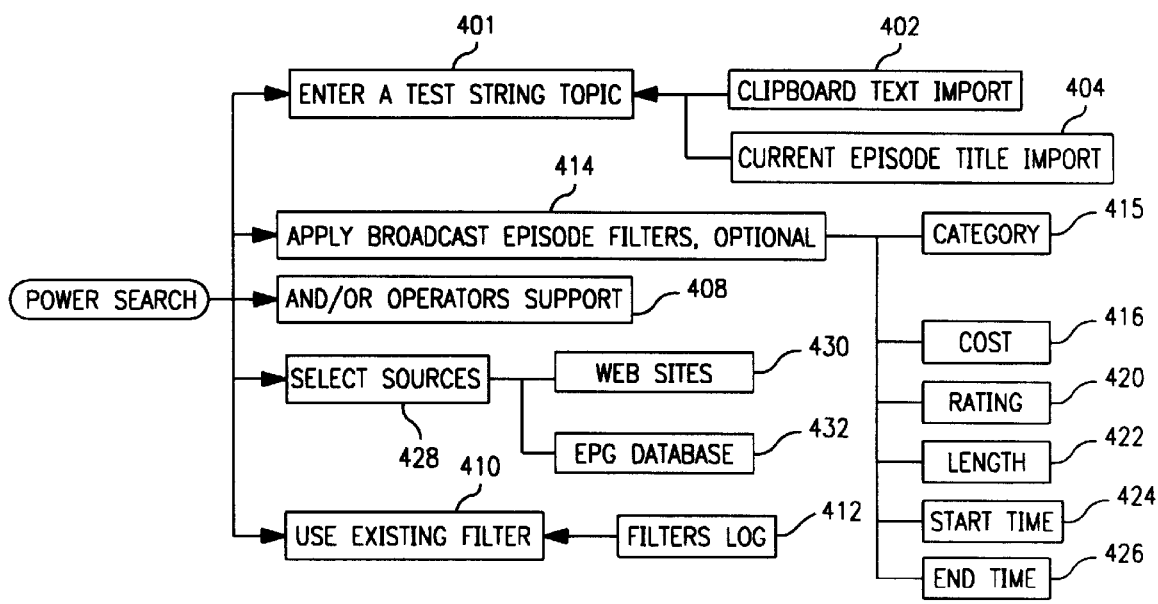
FIG. 4 illustrates steps performed to create a filter used to search broadcast information and Internet information in accordance with the teachings of the present invention.

In addition, the user can maintain filter logs that reflect the filter terms used to perform the search. These logs can be selected, such that the search can be re-performed at a later time. The first step in the process is the creation of a filter to be used. This process is described with reference to FIG. 4. Text strings 401 are entered or selected for the topic list which indicate the topic or terms to be used to perform the search. In block 402, the text can be entered by typing in information, or importing information from the EPG 404, such as the current title of a program currently being broadcasted on the user's desktop display 205. Logical operators can be used 408 to combine multiple terms. An existing filter can be used 410 by selecting existing filters from the filter log 412. In addition, filters or search terms can be acquired from information associated with a broadcast 414. For example, information such as broadcast categories 415 (news, sports, drama, etc.), cost 416, rating 420, length 422, start time 424, and end time 426 are examples of parameters supplied by the broadcast system for generation of an electronic program guide. This information can be used to generate the filters used to perform the search. All or some of these filters and terms can be used. The search is flexible to select one or a plurality of information resources. In the present embodiment, the user can select 428 to search the World Wide Web 430 or an electronic program guide 432. It is readily apparent to one skilled in the art that other resources may be used.

Figure 5:
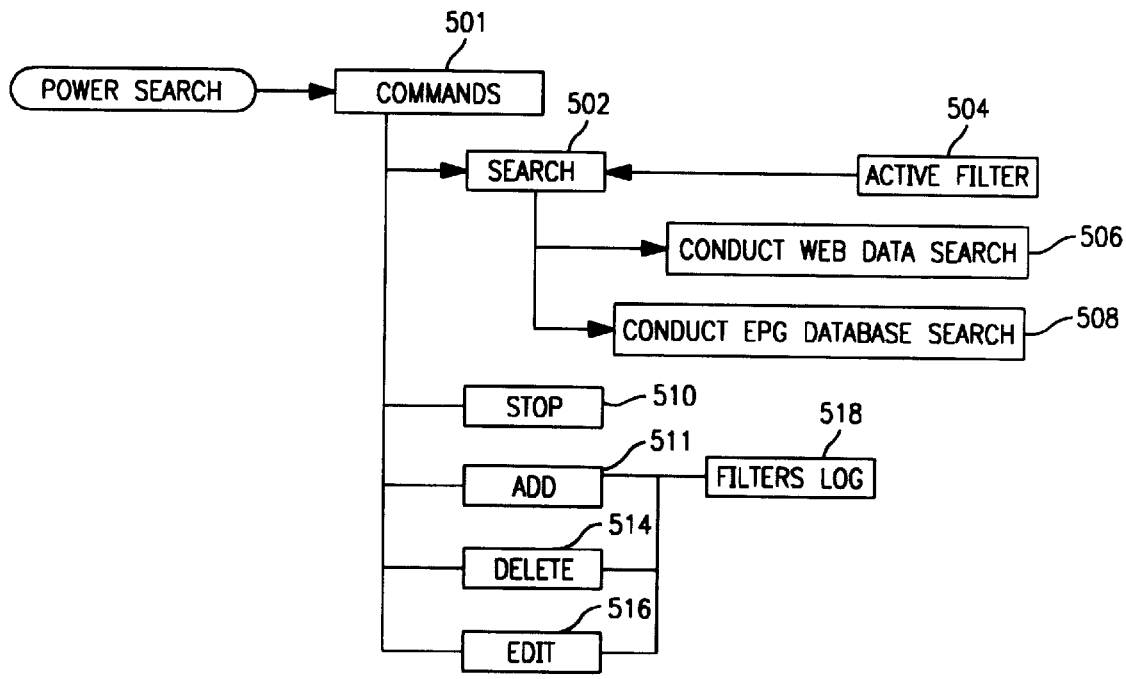
FIG. 5 illustrates the steps performed to activate a search.

Once the filter is created, and the "Go" button is selected, the search is activated. The process is illustrated with respect to FIG. 5. Commands 501 are used to specify certain parameters. After a search is initiated 502 using the active filter specified 504, the search mechanism conducts a search of the World Wide Web 506, and the EPG 508. At any time the search may be stopped 510; the filters added to the filter log 511, the present filter delete from the log 514 or edited 516, resulting in an updated filter log 518. Using the filter specified, the system automatically generates the query to perform the search on the web and/or on the EPG. This can be performed a number of ways recognized by those skilled in the art. For example, a script can be generated that executes the sequence of commands needed to access the web and perform the search using existing search engines or a specially created search engine. Similarly, the search is performed on the EPG using a search tool. The search tool may be a simple text search tool or database search tool, or a tool specifically written for searching the EPG.

Figure 6:
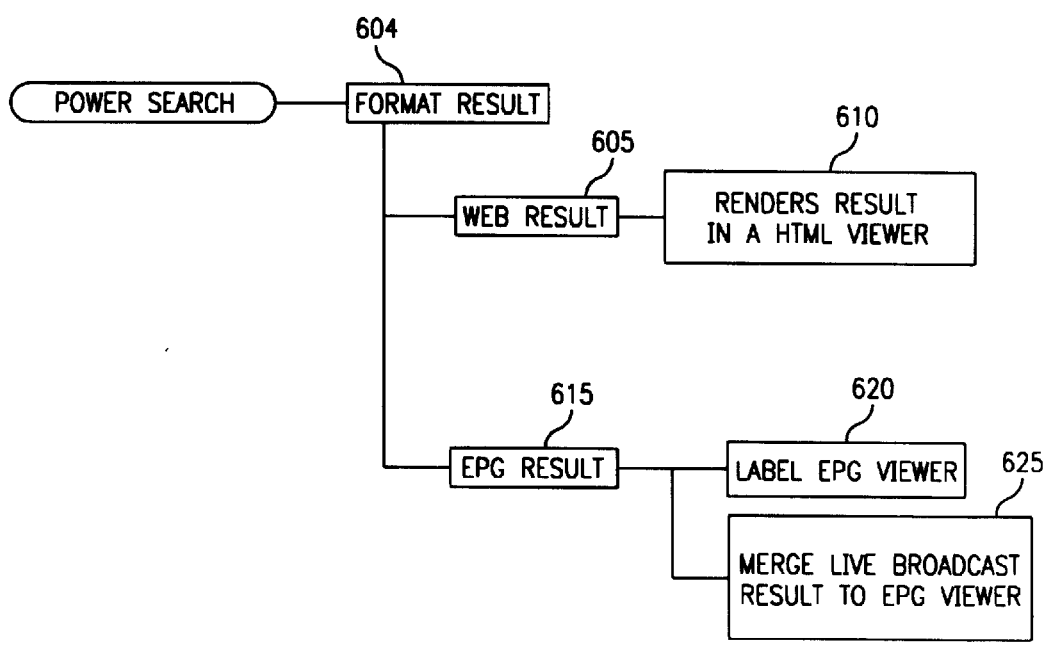
FIG. 6 illustrates the steps performed to render on a display the query of the results of the search performed.

Once the search has been performed, the results are presented to the user. This is illustrated by the flow diagram of FIG. 2 and the exemplary display shown in FIG. 6. Referring to FIG. 6, results can be formatted a number of ways. In the present embodiment, the result 604 of any web searches 605 are presented in an HTML frame 610 on the display. For example, if multiple web sites meet the search criteria, the user may be presented a listing of web sites with the ability to move a cursor over to a web site URL and select the URL to bring up the particular web site. Alternately, a first web site can be automatically brought to the user's display or multiple web sites can be displayed, and the user can go forward or back across the multiple sites inside the HTML window.

The results of the search performed on the electronic program guide 615 are displayed a variety of ways. For example, the EPG is modified to only display those programs that meet the search criteria. This is illustrated in FIG. 2 in window 220. Alternatively, the areas of the EPG corresponding to programs that meet the criteria are highlighted by a different color. Furthermore, in one embodiment, the user is able to change the current broadcast 625 to one of the programs currently broadcast that meet the search criteria. For example, this might be done by selecting a program from the modified EPG. Selection maybe achieved a variety of ways. For example, the user may indicate selection by using a remote control to enter the station number ID or by moving the cursor to point to the desired program. The system then responds by tuning to the program selected (the program being one of the programs that meets the search criteria).

In an alternative environment, the search is initiated in the background by the selection of a program in the EPG.

Preferably, the filter elements of a selected program, such as a particular broadcasted program on the user's desktop display, are determined from selected program elements of the EPG. For example, providers of satellite broadcasts provide electronic program guide streams from which the receiver devices can generate electronic program guides visible to the user. This information typically includes the title, abstract of the program, duration of the program, time of broadcast, and lead actors in the program. Upon selection of a particular broadcast to view, a background search can automatically be initiated using all or some of the parameters of the program element information provided with the program. For example, if the broadcast is a movie called "X", a search initiated by title could bring up the web site about the "X" movie. Alternately, if the broadcast is a show directed to the subject of whales, for example, a search can be initiated based on the abstract on the topic of whales, and web sites directed to that topic would automatically be provided to the user. Thus, the user would automatically receive information on a subject of interest from a variety of resources.

In either of the environments discussed above, the information associated with a broadcast can be more than just a sequence of keywords. Keywords can be combined with logical syntactic operators such as AND, OR and NOT to produce boolean combinations of search terms and to provide a more intelligent query. For example, a popular search engine is the one provided by the Alta Vista site www.altavista.digital.com. Either the simple query or advanced query syntax as documented at this site may be used. Other query syntax may be used.

Additionally, a complete search query can be provided in association with a broadcast. That is, a string of keywords combined with operators can be included in the EPG associated with a broadcast, included in the vertical blank interval of a broadcast signal itself, included in an Internet server "push" of data to the system of the present invention in association with a broadcast program, etc. That is, the search query can be formed at the content-provider end rather than having the system at the user end construct the query.

As another refinement, search results can be provided by the content-provider so that the receiving user system does not have to perform a search. This last approach has the advantage of eliminating the unrelated information that may turn up from an Internet search but has the drawback that a large amount of information in the form of URL information must be transmitted. Still, where the number of URLs transmitted is small, this last approach may be the most efficient.

In one embodiment, this search is performed in the background so as not to disturb foreground processes, such as display of a broadcast or video. If the search identifies related web sites, for example, a discreet animated alert is provided to the user, for example, in the user's tools area, enabling the user to selectively bring up the related web sites by selecting the alert. If the user selects to view the web sites, the web sites are then displayed in the HTML window provided on the user's desktop display.

The invention has been described in the context of a preferred embodiment. It is readily apparent to one skilled in the art that numerous alternatives, modification, variations and uses will be apparent to those skilled in the art in light of the foregoing description.

What is claimed is:

1. A power searching method comprising the steps of:
    providing a search tool window that enables the generation of filter elements for selectively searching an electronic program guide and at least one separate information resource;
    selecting filter elements for a search, wherein the filter elements are based upon user defined search terms;
    instituting a search of the electronic program guide and the at least one separate information resource using the selected filter elements, wherein the selected filter elements are common for the search the electronic program guide and the at least one separate information resource;
    generating a result set of search results;
    applying the result set to an electronic program guide window to modify the guide to indicate those programs that meet the filter elements; and
    generating an information resource window displaying results of the search of the at least one separate information resource based upon the filter elements.

2. The method as set forth in claim 1, further comprising the step of
    providing an audio/visual window comprising a broadcast of a program.

3. The method as set forth in claim 2, further comprising the step of selecting a program to be displayed in the audio/visual window by selecting a program from the modified electronic program guide.

4. The method as set forth in claim 1, wherein the at least one separate information resource is the world wide web and the information resource window displays a list of URLs of web sites that are part of the result set of search results.

5. The method as set forth in claim 1, wherein the at least one separate information resource is the world wide web and the information resource window comprises a web browser that displays a list of URLs of web sites that are part of the result set of search results.

6. The method as set forth in claim 1, wherein the step of selecting filter elements for a search is performed by a user.

7. The method as set forth in claim 1, wherein the step of selecting filter elements for a search is automatically determined from program elements of a selected program from the electronic program guide.

8. The method as set forth in claim 7, wherein the step on initiating a search is performed in the background when a broadcasted program is selected for display.

9. In a system having a processor, memory and a display, a power search tool comprising:
    an electronic program guide window including an electronic program guide;
    a search tool window configured to enable the generation of filter elements for selectively searching an electronic program guide and at least one separate information resource, wherein the filter elements are based upon user defined search terms; and
    logic configured to search the electronic program, guide and apply a result set to the electronic program guide window to modify the electronic program guide displayed to indicate those programs that meet the filter elements and to generate an information resource window displaying results of the search of at least one separate information resource based upon the filter elements, wherein the filter element, are common for the search the electronic program guide and the at least one separate information resource.

10. The system as set forth in claim 9, further comprising an audio/visual window comprising a broadcast of a program.

11. The system as set forth in claim 9, wherein the at least one separate information resource is the world wide web and the information resource window displays a list of URLs of web sites that are part of the result set of search results.

12. The system as set forth in claim 9, wherein the at least one separate information resource is the world wide web and the information resource window comprises a web browser that displays a list of URLs of web sites that are part of the result set of search results.

13. The system as set forth in claim 9, wherein the logic is further configured to automatically select filter elements for a search from program elements of a selected program from the electronic program guide.

14. The system as set forth in claim 13, further comprising an audio/visual window comprising a broadcast of a program, wherein the logic is further configured to initiate a search in the background when a broadcasted program is selected for display in the audio/visual window.

15. A computer readable medium containing executable instructions which, when executed in a processing system, cause the system to perform a power search of an electronic program guide and at least one information resource the executable instructions comprising:

a first set of executable instructions configured to select filter elements for a search, wherein the filter elements are based upon user defined search terms;

a second set of executable instructions configured to institute a search of the electronic program guide and the at lest one separate information using the selected filter elements, wherein the selected filter elements are common for the search the electronic program guide and the at least one separate information resource;

a third set of executable instructions configured to generate a result set of search results;

a fourth set of executable instructions configured to apply the result set to an electronic program guide window to modify the guide to indicate those programs that meet the filter elements; and a fifth set of executable instructions configured to generate an information resource window displaying results of the search of the at least one separate information resource based upon the filter elements.

16. The computer readable medium as set forth in claim 15, containing further executable instructions which, when executed in the processing system comprise providing an audio/visual window comprising a broadcast of a program.

17. The computer readable medium as set forth in claim 15, wherein the at least one separate information resource is the world wide web and the information resource window displays a list of URLs of web sites that are part of the result set of search results.

18. The computer readable medium as set forth in claim 15, wherein the at least one separate information resource is the world wide web and the information resource window comprises a web browser that displays a list of URLs of web sites that are part of the result set of search results.

19. The computer readable medium as set forth in claim 15, wherein said instructions for selecting filter elements for a search comprises instructions, which when executed by the system, automatically determines filter elements from program elements of a selected program from the electronic program guide.

20. The computer readable medium as set forth in claim 19, wherein the instruction for initiating a search is executed in the background when a broadcasted program is selected for display.

* * * * *

UNITED STATES PATENT AND TRADEMARK OFFICE
CERTIFICATE OF CORRECTION

PATENT NO.    : 6,005,565
DATED         : December 21, 1999
INVENTOR(S)   : Legall et al.

It is certified that error appears in the above-identified patent and that said Letters Patent is hereby corrected as shown below:

In column 7 at line 24 delete "cause" and insert --causes--

Signed and Sealed this

Third Day of April, 2001

Attest:

NICHOLAS P. GODICI

*Attesting Officer*     Acting Director of the United States Patent and Trademark Office